United States Patent
Noe

(10) Patent No.: US 7,357,022 B2
(45) Date of Patent: Apr. 15, 2008

(54) STRIP PLANARITY MEASURING METHOD AND APPARATUS

(75) Inventor: Andreas Noe, Kerken (DE)

(73) Assignee: BWG Bergwerk-und Walzwerk-Maschinenbau GmbH, Duisburg (DE)

(*) Notice: Subject to any disclaimer, the term of this patent is extended or adjusted under 35 U.S.C. 154(b) by 270 days.

(21) Appl. No.: 11/060,086

(22) Filed: Feb. 14, 2005

(65) Prior Publication Data
US 2005/0183497 A1  Aug. 25, 2005

(30) Foreign Application Priority Data
Feb. 20, 2004  (DE) .................. 10 2004 008 303

(51) Int. Cl.
*G01L 5/04* (2006.01)
(52) U.S. Cl. .......................... 73/159; 73/105
(58) Field of Classification Search .............. 73/159, 73/104, 105, 862.55, 862.391, 862.451, 862.453, 73/862.041, 862.045, 862.06, 862.07; 33/732, 33/832, 533
See application file for complete search history.

(56) References Cited

U.S. PATENT DOCUMENTS

| | | | |
|---|---|---|---|
| 3,817,095 A * | 6/1974 | Diolot | 73/159 |
| 4,127,027 A * | 11/1978 | Berger et al. | 73/862.07 |
| 5,111,688 A * | 5/1992 | Houghton et al. | 73/159 |
| 5,629,487 A * | 5/1997 | Mucke et al. | 73/818 |
| 6,122,978 A * | 9/2000 | Callendrier | 73/862.474 |
| 6,354,013 B1 * | 3/2002 | Mucke et al. | 33/533 |
| 6,853,927 B2 * | 2/2005 | Noe et al. | 702/41 |

FOREIGN PATENT DOCUMENTS

DE  42 36 657  5/1994

* cited by examiner

*Primary Examiner*—Robert Raevis
(74) *Attorney, Agent, or Firm*—Andrew Wilford

(57) ABSTRACT

A method and a surface evenness measuring roller for determining surface evenness measurement errors in steel and metal band comprising at least one measuring head having part measuring heads which part measuring heads are integrated respectively offset by 180° into the roller mantel and supported on two force transmitters and are further separated from the roller mantle by means of a circumferential motion gap and are braced with respect to one another by means of at least one tie rod wherein in the course of a measurement of the band tensile stress distribution over the whole band width the band with band is subject to tension over its whole band width wraps around the surface evenness measuring roller with a predetermined arc of contact and thereby exerts pressing forces onto the surface evenness measuring roller from which pressing forces can be determined the band tension distribution.

13 Claims, 6 Drawing Sheets

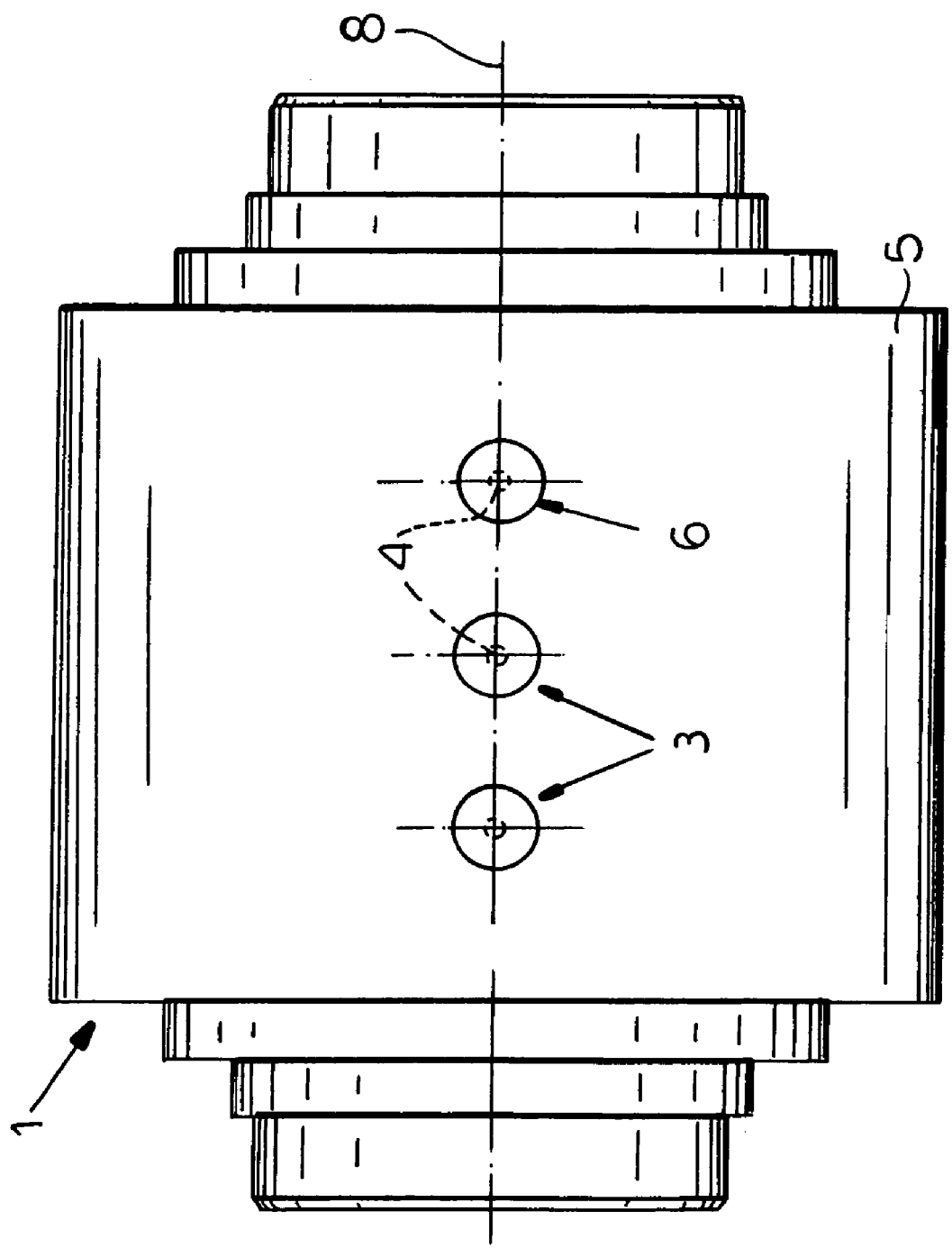

STRIP PLANARITY MEASURING METHOD AND APPARATUS

FIELD OF THE INVENTION

My present invention relates to a method of determining surface evenness errors (defects or irregularity in strip planarity) and particularly steel and metal strip as the strip passes through strip processing lines or mill trains.

BACKGROUND OF THE INVENTION

Strip planarity measurement is known, for example, from EP 1 369 186 A2 (U.S. Pat. No. 6,853,927) that uses a surface evenness measuring roller with at least one integrated beam sensor. The beam sensor extends longitudinally in a wavy or straight line over the length of the roller for the purpose of determining tensile forces acting on said roller from the strip. The strip is partially wrapped around the sensor roller wherein during the determining of the tensile force the beam sensor with its starting region and its end region is at least occasionally within an arc of contact that is formed by the band. The sensor beam is supported at its end on load cells and/or force transmitters.

The beam sensor is fastened to the roller body with the help of two preloading bolts which preloading bolts are guided through internal bore holes of the force transmitters and apply a predetermined preloading force to the force transmitters. Such measures are also known in the realizing of radially stressed and annulus-shaped covers for the force transmitters (see also DE 42 36 657 C2).

The force transmitters are piezoelectric units, usually of quartz (piezo quartzes) which require a bias voltage in order to be able to measure pressure forces. However the piezo quartz piercing preloading bolts necessarily produce a force shunt such that all the measured forces are not introduced to the force transmitters and rather a portion thereof is introduced into the preloading bolts. The force shunt can amount to up to 30%. Although the influence of the force shunt can be initially filtered out by means of a calibration, this is effective only where the force shunt remains constant. In fact however there is a danger that the magnitude of the force shunt will change in operation, e.g. due to temperature changes, and thereby falsify the measurement result. In addition the measured signals will not then correspond to the full measured force. One might well consider using as force transmitters strain gauges which require no bias voltage whereby no force shunt is generated. Such strain gauges however have in comparison with piezo quartzes a relatively low measuring accuracy.

OBJECT OF THE INVENTION

The object of the invention is to provide an improved method and an improved evenness measuring roller for the purpose of determining surface evenness errors (planarity) in strip and particularly steel and metal strip wherein piezo quartzes can be used as force transmitters with no anti-beneficial force shunt.

SUMMARY OF THE INVENTION

In order to achieve this object the invention provides a process for the purpose of determining surface evenness measurement errors in strip and particularly steel and metal strip by a measurement of the band tensile stress distribution over the entire strip width wherein the strip which is subject to tensile stress over its whole width wraps around a surface evenness measuring roller with a predetermined arc of contact and thereby exerts local pressing forces corresponding to the local longitudinal tensile stress distribution in the band width direction onto the surface evenness measuring roller.

Local pressing forces corresponding to the band tensile stress distribution are determined in that the surface evenness measuring roller comprises at least one measuring head having two part measuring transmitters or units (also referred to herein as respective heads) which part measuring transmitters are integrated respectively offset by 180° into the roller mantel or surface and supported (preferably) on two force transmitters and are further separated from the roller mantel by means of a peripheral clearance (e.g. a circumferential gap) allowing motion and are braced with respect to one another via at least one tie rod.

Moreover the measured values of the force transmitters of one of each part measuring head are added together and then the sum values of the two part measuring heads are subtracted from one another and the differential measured value thus formed corresponds to the overall local force of pressure minus the weight of the measuring head and/or its part measuring heads.

These measures of the invention provide for a completely force shunt-free measuring of the local pressing forces. In fact the process according to the invention is characterized by high measuring accuracy taking into account optimised dynamic response behavior with adequate rigidity of the force transmitters.

The centrifugal forces of the two part measuring heads which centrifugal forces can reach the order of magnitude of the measured forces at high roller revolution counts self-compensate due to the fact that the two part measuring heads are disposed offset by 180° with respect to one another and are connected by a tie rod.

Moreover there exists the opportunity of determining the weight of the measuring head in a calibration measurement as a function of the roller torque angle without pressing forces and to use said weight as a correcting function for the measured value analysis. The weight component describes a sinus function over the coincidently measured torque angle of the sensor roller. By means of a single calibration a correction function can be determined as a function of the torque angle such that the weight influence on the measurement is neutralized. Thus the measured forces at a predetermined torque angle can be fully determined by means of the measured signals of the force transmitters. In fact in the case of strip measurements the corrected measured signal corresponds in full to the local force of pressure.

The method of the invention thus comprises the steps of:

(a) providing a surface unevenness measurement roller having two measuring units spaced apart angularly on the roller through 180° and each including at least one member with peripheral clearance bearing upon the strip as the strip passes over a surface of the roller and the roller is rotated in contact with the strip, and respective force transmitters responsive over the width of the strip to tensile stress distribution in the strip;

(b) interconnecting the members of the measuring units spaced apart by 180° by at least one tie rod where force is transferred between the tie rods; and (c) evaluating surface unevenness of the strip from a measured force obtained by summing values from the force transmitters of each of the measuring units to respective sums, subtracting one of the sums from the other to obtain a differential force, and subtracting from the differential force a weight of the measuring heads to provide the measured force.

The subject the invention is moreover a surface evenness sensor roller for the purpose of executing the process in accordance with the invention and consequently for the purpose of determining surface evenness errors in strip and particularly steel strip and other metal strip while the strip e.g. passes through band processing lines or mill trains. The roller has at least one measuring head having two part measuring heads which part measuring heads are integrated respectively offset by, 180° into the roller mantel and supported on two force transmitters and are further separated from the roller mantel by means of the circumferential motion gap and are braced with respect to one another by means of at least one tie rod wherein in the course of a measurement of the band tensile stress distribution over the width of the strip.

The strip is subject to tensile stress over its whole width and wraps around the surface evenness sensor roller with a predetermined arc of contact and thus exerts local pressing forces corresponding to the local longitudinal distribution of tensile stress in the strip width direction onto the surface evenness sensor roller. From these local pressing forces, the band tensile stress distribution can be determined.

In order to detect the measuring pressure correctly and fully the sum of the measured signals of the force transmitters on the part measuring heads in the region of the band wrap is calculated first. From this is subtracted the sum of the measured signals of the force transmitters on the oppositely disposed part measuring heads and the weight of the measuring head and consequently the two part measuring heads.

The part measuring heads can be tear-shaped and respectively centrally supported on a force transmitter.

According to a preferred embodiment of the invention it is however provided that the part measuring heads are formed as beam sensors and are supported in the beam end regions on force transmitters. The force transmitters are formed as piezo quartzes. The beam sensors can be disposed in a straight line or obliquely with respect to the roller axis. The oblique arrangement owes a wave-shaped progression of the beam sensor. Into the part measuring head encircling motion gap or clearance a permanently elastic adhesive and/or a seal or in the case of a circular embodiment of the measuring head an O-ring can be inserted. Expediently the measuring heads comprise more than two part measuring heads whereby the number of measurements per roller revolution increases. A metal foil is adhesively connected to the roller top surface in order to prevent shear stresses in the pressed strip regions and preferably covers the measuring head and/or its part measuring heads. The same also applies in the event that the surface evenness sensor roller according to the invention comprises a sheath made of rubber, synthetic material or hard alloy. It is finally provided that two or more measuring heads are disposed in each strip width region whereby the number of measurements per roller revolution also increases.

BRIEF DESCRIPTION OF THE DRAWING

The above and other objects, features, and advantages will become more readily apparent from the following description, reference being made to the accompanying drawing in which:

FIG. 3 is a view similar to FIG. 1 which shows a modified embodiment comprising circular part measuring heads.

SPECIFIC DESCRIPTION

Figure 1:
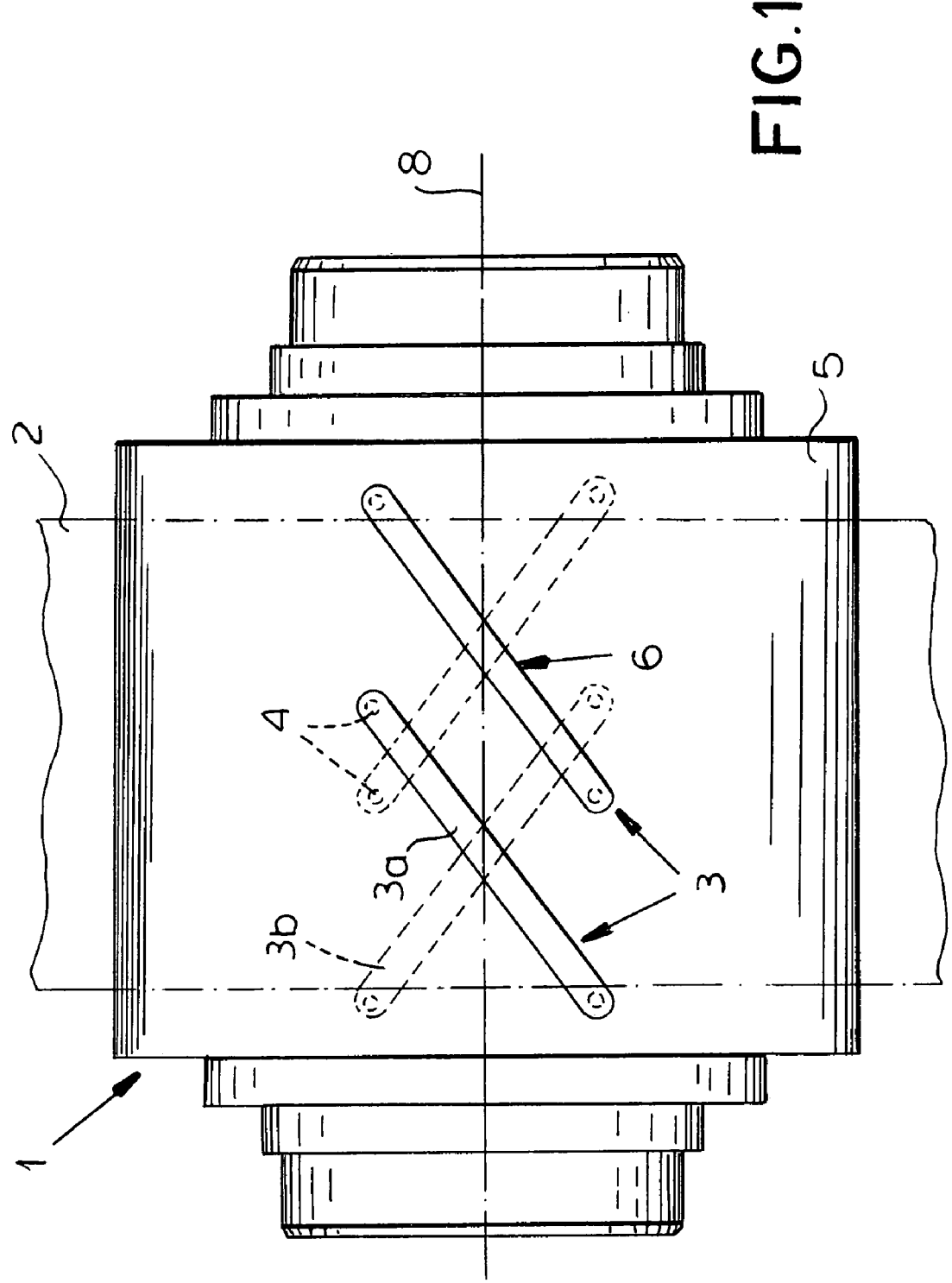
FIG. 1 is a plan view of a surface evenness sensor roller comprising beam sensors as part measuring heads.

FIGS. 1 to 4 illustrate surface evenness (planarity) sensor rollers 1 for the purpose of determining surface evenness errors, defects or irregularities, in strip 2 and particularly steel strip and other metal strip as the strip 2 passes for example through strip processing lines or rolling mill trains.

This surface evenness sensor roller comprises at least one measuring head or unit 3 with two part measuring heads integrated in the roller and respectively offset by 180° in the roller mantel or surface and supported on two force transmitters 4. The heads are further separated from the roller mantel 5 by means of a circumferential motion gap (peripheral clearance) 6 and braced with respect to one another by means of at least one tie rod 7.

In the course of a measurement of the band tensile stress distribution over the strip width the strip 2 is subjected to tensile stress over its whole strip width and wraps around the surface evenness sensor roller 1 with a predetermined arc of contact and thus exerts local pressing forces corresponding to the local longitudinal tensile stress distribution over the strip width direction onto the surface evenness sensor roller 1. From these local pressing forces the strip tensile stress distribution can be determined.

Figure 2A:
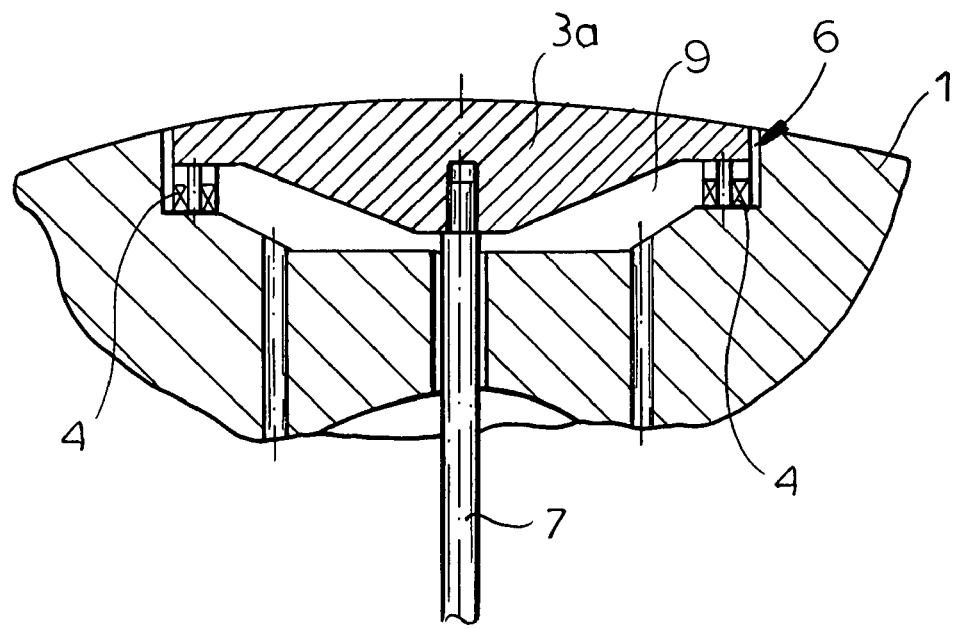
FIGS. 2A and 2B are sections taken through two of the measuring units of the instant invention along respective planes that extend across each other.
Figure 2B:
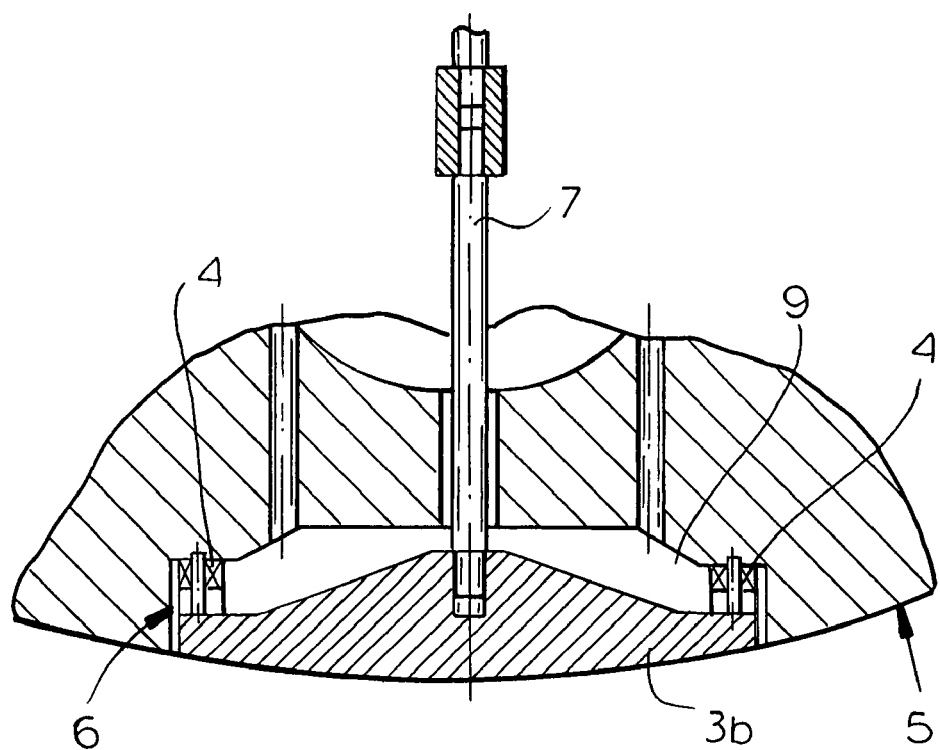

In the case of the embodiment of FIGS. 1 and 2 the part measuring heads 3a, 3b are formed as beam sensors and are supported in the beam end regions on force transmitters 4.

Figure 4:
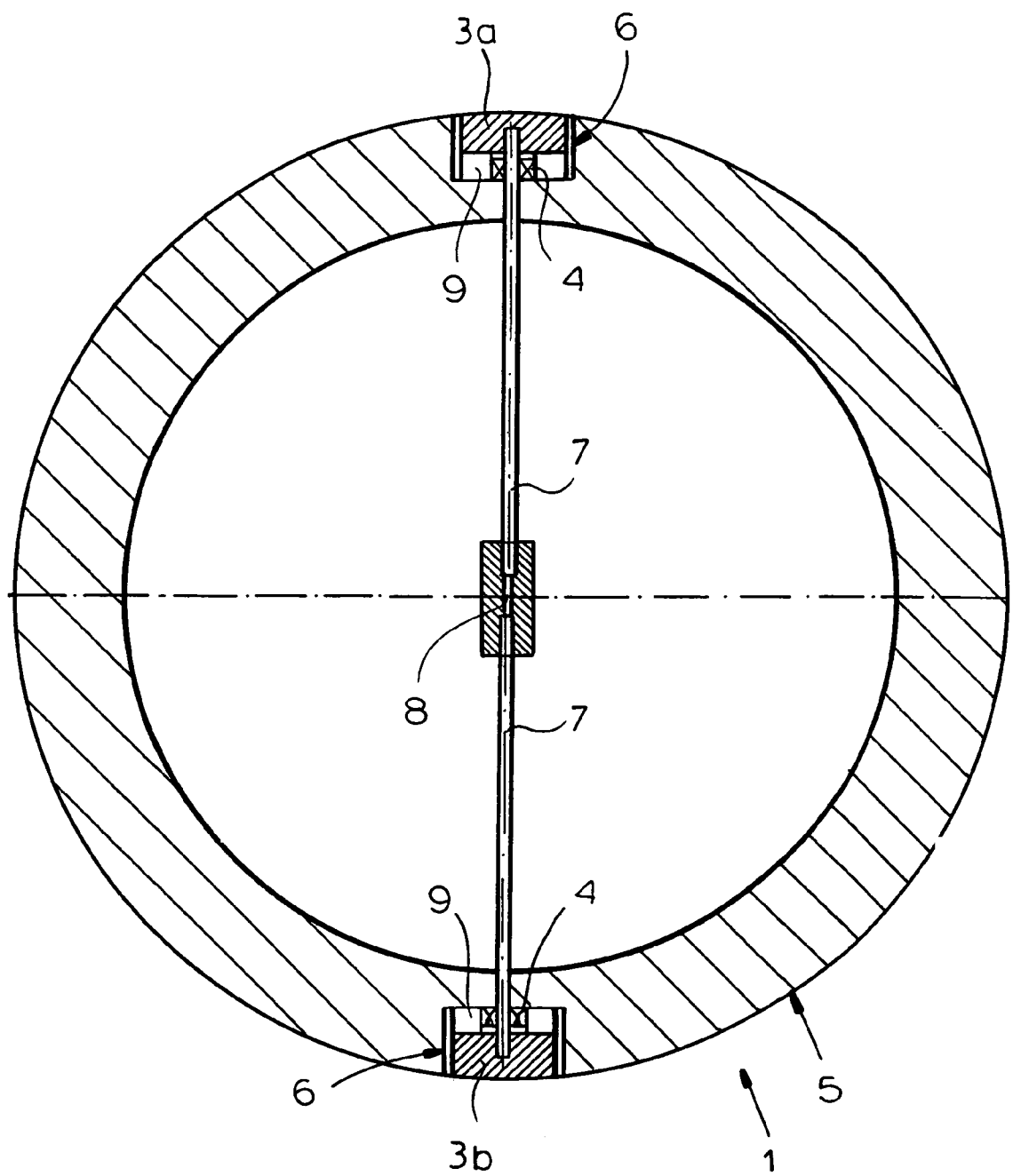
FIG. 4 is a radial section through the embodiment of FIG. 3 in the region of the part measuring heads.

In the case of the embodiment of FIGS. 3 and 4, the part measuring heads 3a, 3b comprise a circular formation and are respectively centrally supported on force transmitters 4. The force transmitters 4 are formed as piezo quartzes.

Figure 6:
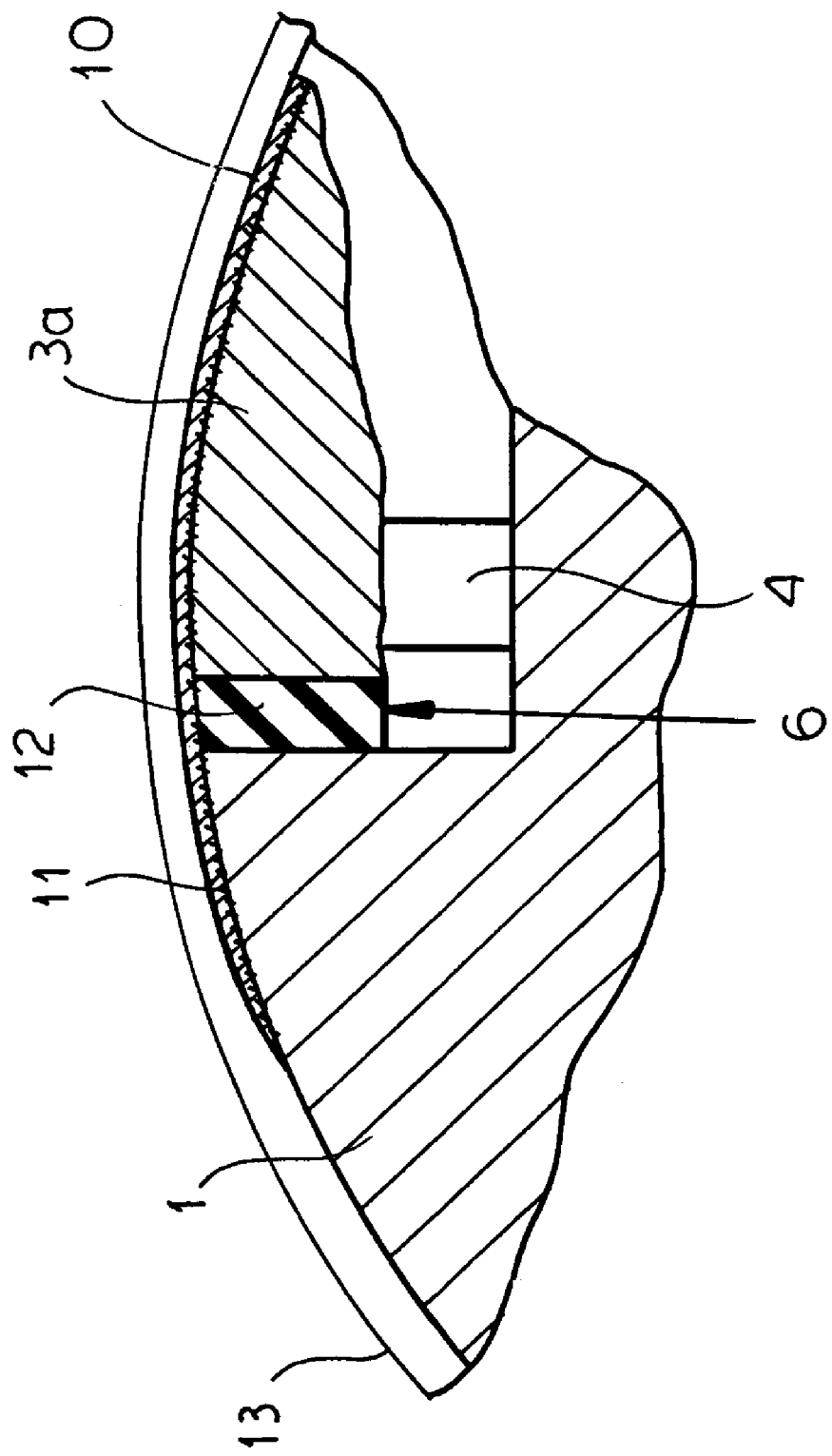
FIG. 6 is a detail section.

FIG. 6 shows the roller 1 of FIG. 1 which has been provided, additionally with a seal of a permanently elastic adhesive or elastomer at 12 which allows motion of the measuring member 3a relative to the roller 1 and can be disposed in the peripheral clearance. That permanently elastic material can bond to the surfaces defining the peripheral gap 6.

In addition, across the gap there is provided a metal foil 10 which is bonded by an adhesive to the top surface of the roller, the adhesive being represented at 11, in order to prevent shear stresses in regions of the pressed strip. The metal foil can cover the measuring head 3a as well. It is also possible to provide a sheath over the sensor roller as represented diagrammatically at 13, this sheath being made of rubber or a synthetic resin. If the sheath is inflexible, i.e. composed of a hard alloy, it generally will not cover the measuring head but will terminate flush therewith. In that case the sheath can be composed of a hard alloy.

In the case of the embodiment (FIG. 1) with the beam sensors, the beam sensors are obliquely disposed with respect to the roller axis 8 and consequently assume a wave-shaped progression. Preferably two or more measuring heads 3 are disposed in each band width region. For the purpose of receiving the measuring heads 3 and/or their part measuring heads the roller body comprises cutouts 9 wherein the part measuring heads 3a, 3b align with the roller top surface and form an extremely narrow motion gap 6 with the part measuring head 3a, 3b encircling cutout.

Figure 5:
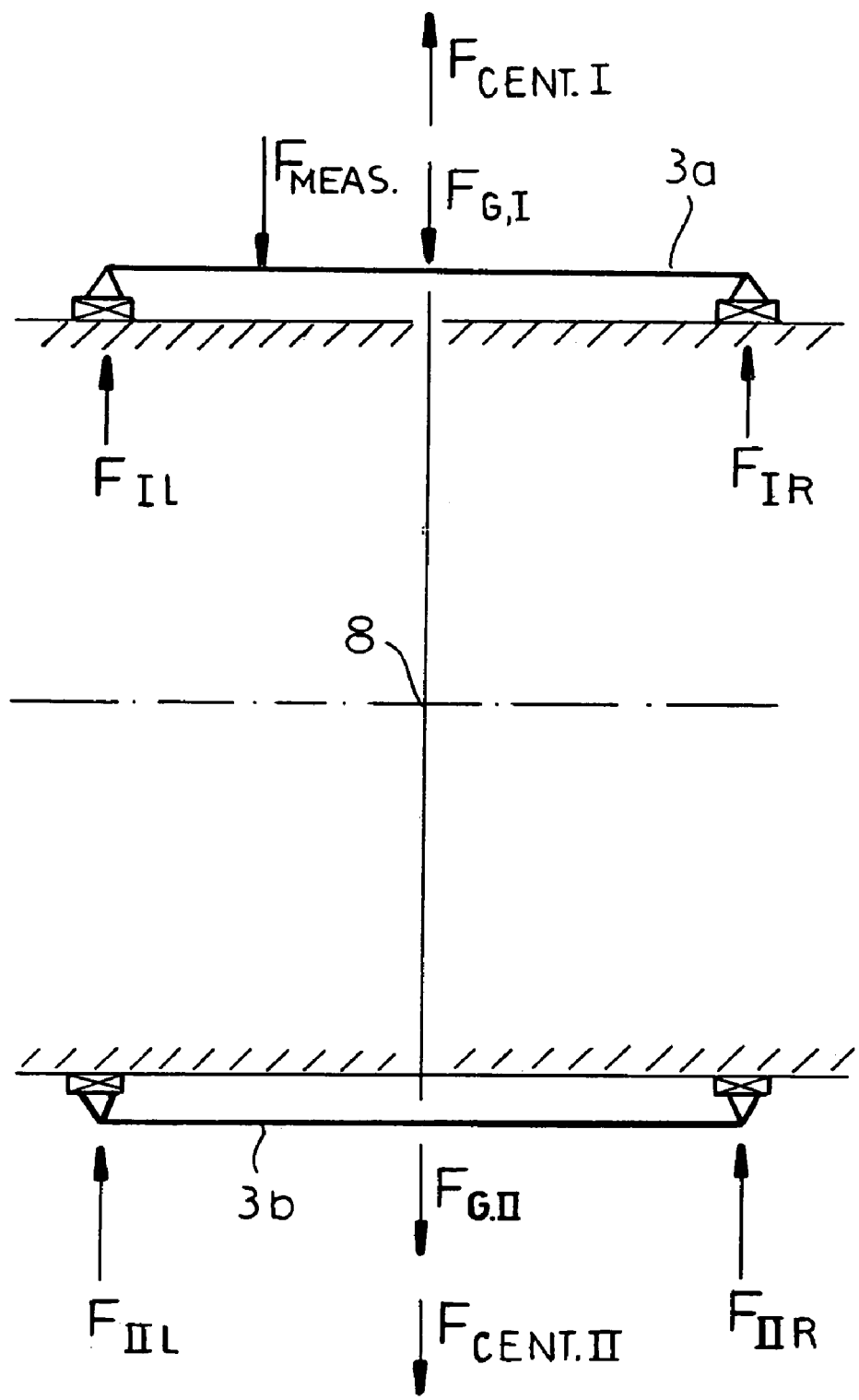
FIG. 5 is a force diagram for the embodiment of FIG. 2.

The forces that act on the measuring head and/or its part measuring heads 3a, 3b in the Z-direction acting are illustrated in FIG. 5. Accordingly the following applies:

$$F_{G,I} = F_{G,II};$$

$$F_{Cent.,I} = F_{Cent.,II};$$

$$\sum F = 0 \longrightarrow F_{Meas.} = F_{IL} + F_{IR} + F_{IIL} + F_{IIR} - 2F_{G,I}$$

$F_{Cent.I}$ and $F_{Cent.II}$ being the equal and opposite centrifugal forces which apply and $F_{G,I}$ and $F_{G,II}$ being the equal but codirectional gravitational (weight) forces which apply. $F_{IL}$ and $F_{IIL}$ are the forces measured by the transmitters on the left side of the measuring heads and $F_{IR}$ and $F_{IIR}$ are the forces measured by the transmitters on the right side of the measuring heads.

$$\longrightarrow F_{Meas.} = \sum F_{SI} - \sum F_{SII} - 2F_{G,I}$$

In the foregoing, $F_{SI}$ represents the sum of the forces from the left and right force transmitters 4 of one measuring head 3a while $F_{SII}$ represents the sum of the forces from the other measuring head 3b coupled to the first by at least one tie rod.

I claim:

1. A method of determining planarity defects in strip, the method comprising the steps of:
   (a) providing a surface unevenness measurement roller centered on an axis and having two measuring units spaced apart angularly of the axis on the roller by 180° and each including
   a member set in the roller with peripheral clearance and bearing upon said strip as said strip passes over a surface of said roller and said roller is rotated about the axis in contact with the strip, and
   a respective force transmitter responsive over the width of the strip to tensile stress distribution in the strip;
   (b) interconnecting said members of said measuring units spaced apart by 180° by at least one generally diametrally extending tie rod such that force is transferred between the measuring units via said tie rod; and
   (c) evaluating surface unevenness of the strip from a measured force obtained by summing values from the force transmitters of each of the measuring units to respective sums, subtracting one of the sums from the other to obtain a differential force, and subtracting from said differential force a weight of said measuring units to provide said measured force.

2. The method defined in claim 1, further comprising the steps of
   determining the weight of said measuring units in a calibration measurement as a function of a torque angle of said roller without pressing forces, and
   correcting the measured force in response to said calibration measurements.

3. A surface evenness sensor comprising:
   a measurement roller centered on an axis;
   two measuring units spaced apart angularly of the axis on said roller by 180° and each including
   a member set in the roller with peripheral clearance at a surface of said roller and bearing upon a strip passing around at least a portion of said surface as said roller is rotated in contact with the strip, and
   a force transmitters acted upon by the respective member; and
   a tie rod bracing said members against one another such that in a course of measurement of strip tensile stress distribution over a width of the strip, pressing forces are exerted on said members corresponding to local longitudinal tensile stress distribution representing evenness of the surface of said strip.

4. The surface evenness roller defined in claim 3 wherein said members are circular and are centrally supported on the respective force transmitters.

5. The surface evenness roller defined in claim 3 wherein said members are beam sensors supported at beam ends on respective force transmitters.

6. The surface evenness roller defined in claim 5 wherein said beam sensors are disposed obliquely to an axis of the roller.

7. The surface evenness roller defined in claim 3 wherein said force transmitters are piezo quartzes.

8. The surface evenness roller defined in claim 3 wherein a permanently elastic adhesive is provided in said clearance.

9. The surface evenness roller defined in claim 3, further comprising a seal in said clearance.

10. The surface evenness roller defined in claim 3 wherein more than two measuring units are provided on the roller.

11. The surface evenness roller defined in claim 3, further comprising at least one metal foil covering said measuring units.

12. The surface evenness roller defined in claim 3 wherein said roller is provided with a sheath made of rubber, a synthetic resin or a hard alloy.

13. The surface evenness roller defined in claim 3 wherein at least such two measuring units are disposed in respective regions of a strip width.

* * * * *